United States Patent

Brünnemann et al.

[11] Patent Number: 5,876,802
[45] Date of Patent: Mar. 2, 1999

[54] AQUEOUS TWO-COMPONENT POLYURETHANE COATING COMPOSITION, PROCESS FOR ITS PREPARATION, AND ITS USE IN METHODS OF PRODUCING A MULTICOAT PAINT SYSTEM

[75] Inventors: Michael Brünnemann, Münster; Uwe Meisenburg, Duisburg; Egbert Nienhaus, Ascheberg; Heinz-Peter Rink, Münster, all of Germany

[73] Assignee: BASF Coatings AG, Muenster-Hiltrup, Germany

[21] Appl. No.: 836,869

[22] PCT Filed: Oct. 28, 1995

[86] PCT No.: PCT/EP95/04234

§ 371 Date: Jul. 3, 1997

§ 102(e) Date: Jul. 3, 1997

[87] PCT Pub. No.: WO96/14348

PCT Pub. Date: May 17, 1996

[30] Foreign Application Priority Data

Nov. 7, 1994 [DE] Germany .................. 44 39 669.4

[51] Int. Cl.[6] ...................................................... B05D 1/36
[52] U.S. Cl. .................. 427/409; 523/406; 523/412; 523/415; 524/507; 524/513; 524/560; 524/591; 524/839
[58] Field of Search .................. 427/407.1, 409; 523/415, 406, 412; 524/507, 591, 560, 839, 513

[56] References Cited

U.S. PATENT DOCUMENTS

| 3,861,425 | 1/1975 | Clark | 138/149 |
|---|---|---|---|
| 4,079,028 | 3/1978 | Emmons et al. | 260/29.6 NR |
| 4,981,921 | 1/1991 | Blum et al. | 525/419 |
| 5,075,370 | 12/1991 | Kubitza et al. | 524/591 |
| 5,275,847 | 1/1994 | Schwarte et al. | 427/407.1 |
| 5,279,862 | 1/1994 | Corcoran et al. | 427/407.1 |
| 5,670,600 | 9/1997 | Nienhaus et al. | 528/75 |
| 5,759,631 | 6/1998 | Rink et al. | 427/407.1 |

FOREIGN PATENT DOCUMENTS

| 4-001254 | 1/1992 | Japan . |
|---|---|---|
| 4001254 A | 1/1992 | Japan . |
| WO 93/07195 | 4/1993 | WIPO . |

*Primary Examiner*—Erma Cameron

[57] ABSTRACT

The present invention relates to an aqueous two-component polyurethane coating composition comprising A) a water-dilutable polyacrylate resin (A) having an OH number of from 40 to 200 and an acid number of from 20 to 100 mg of KOH/g, and B) a polyisocyanate component, characterized in that the water-dilutable acrylate resin is obtainable by solution polymerization of at least one ester of (meth)acrylic acid and a cycloaliphatic $C_6$ to $C_{10}$ alcohol, with the exception of cyclohexyl methacrylate, at least one hydroxyl-containing monomer, if desired, at least one vinyl ester of α-branched monocarboxylic acids having 5 to 18 carbon atoms per molecule and/or at least one reaction product of acrylic acid and/or methacrylic acid with the glycidyl ester of α-branched monocarboxylic acids having 5 to 18 carbon atoms per molecule, at least one carboxyl-containing monomer and, if desired, further, essentially carboxyl-free monomers, the resulting polyacrylate resin being at least partially neutralized and dispersed in water.

23 Claims, No Drawings

AQUEOUS TWO-COMPONENT POLYURETHANE COATING COMPOSITION, PROCESS FOR ITS PREPARATION, AND ITS USE IN METHODS OF PRODUCING A MULTICOAT PAINT SYSTEM

The present invention relates to an aqueous two-component polyurethane coating composition comprising A) a water-dilutable polyacrylate resin (A) containing hydroxyl and carboxylate groups and having an OH number of from 40 to 200 mg of KOH/g, preferably from 60 to 140 mg of KOH/g, an acid number of from 20 to 100 mg of KOH/g, preferably from 25 to 50 mg of KOH/g, and B) a polyisocyanate component (B) as crosslinking agent.

The present invention additionally relates to a process for the preparation of these aqueous coating compositions and to their use in methods of producing a multicoat paint system, as well as to coated articles in which at least one coat has been produced using these coating compositions.

For ecological and economic reasons, the paint industry is attempting to replace as much as possible of the organic solvents employed in coating materials by water. In automotive finishing in particular there is a great need for aqueous coating materials. This applies both to the sector of production-line automotive finishing and to the sector of automotive refinishing. In this context, aqueous coating compositions are employed in particular in the area of topcoats. The term topcoats refers here to coating materials which are used to produce the topmost layer of paint. This topmost layer of paint can comprise one or more coats, especially two coats. Two-coat topcoats consist of a pigmented basecoat and of an unpigmented clearcoat, or a clearcoat which is pigmented only with transparent pigments, which is applied over the basecoat.

Two-coat finishes are nowadays produced by the wet-on-wet method, in which a pigmented basecoat material is first applied and the resulting basecoat is coated over using a clearcoat material, without a baking step, and then basecoat and clearcoat are cured together. This method is very advantageous economically, but places high requirements on the basecoat and clearcoat materials. The clearcoat material applied to the as yet uncured basecoat must not start to dissolve the basecoat or otherwise disrupt it, since otherwise the resulting finishes are of poor appearance. This applies in particular to paint systems in which basecoats containing special-effect pigments (e.g. metal pigments, especially aluminum flakes or pearlescent pigments) are employed. In addition, the topcoat compositions must be able to be applied by spraying with the aid of automatic painting units. For this purpose, their solids content at spray viscosity must be such that films of adequate thickness are obtained with 1 to 2 spray passes (cross-passes), and they must produce baked films which have a good appearance (good evenness, high gloss, good topcoat holdout and high hardness) and good weathering resistance.

In the sector of automotive refinishing, there is the additional requirement that the coating compositions employed are fully curable at low temperatures (generally <80° C.) and, even with curing at these low temperatures, lead to films having the good mechanical properties required.

EP-B-358 979 discloses aqueous two-component polyurethane coating compositions which comprise a hydroxyl-containing polyacrylate resin and a polyisocyanate component. However, when used as a transparent topcoat over a basecoat, these coating compositions are in need of improvement with respect, for example, to the adhesion to the basecoat. There are also problems in respect of other mechanical properties of the resulting coatings, for example in respect of their weathering resistance.

German Patent Application P 43 22 242.0 moreover, which is not a prior publication, discloses aqueous two-component polyurethane coating compositions which comprise a hydroxyl-containing polyacrylate resin and a polyisocyanate component. Hydroxyl-containing polyacrylate resins based on specific cycloaliphatic (meth)acrylic esters, however, are not described in this document.

Furthermore, coating compositions based on hydroxyl-containing polyacrylate resins and crosslinking agents are known, for example, from JP-A 4-1254, where the hydroxyl-containing polyacrylate resins employed as binders are obtainable from hydroxyl-containing monomers, alkyl acrylates and alkyl methacrylates, with or without styrene and with or without ethylenically unsaturated polymers. In that document it is essential to the invention that the polyacrylate resin has been prepared using 4-t-butylcyclohexyl acrylate and/or 4-t-butylcyclohexyl methacrylate as monomer component.

These coating compositions known from JP-A 4-1254, especially when used as transparent topcoat material over a basecoat, exhibit the particular disadvantage of an inadequate pot life of the coating compositions. Finally, the high proportion of organic solvents is a further disadvantage.

The object of the present invention was therefore to provide coating compositions which, when used as clearcoat material over a basecoat, cause only minimal incipient dissolution of the underlying basecoat and exhibit a good light/dark effect when viewed at different angles. At the same time, the resulting coatings should have good chemical resistance and good weathering resistance. In addition, the coating compositions should show very good leveling and should with a minimal content of organic solvents exhibit good application properties under the conditions of automotive refinishing. Furthermore, the coating compositions should be suitable for automotive refinishing, i.e. they should be fully curable at low temperatures of, in general, less than 120° C., preferably less than 80° C. The coating compositions should, moreover, cure rapidly even at these low temperatures (short dust-dry time, rapid freedom from tack and quick through-drying), while at the same time retaining processability for as long as possible (pot life). Finally, the coating compositions should have a good topcoat holdout and, when used as transparent topcoat material over a pigmented basecoat, should lead to coatings with improved adhesion to the clearcoat material.

This object is surprisingly achieved by a coating composition of the type specified at the outset, which is characterized in that component (A) is a hydroxyl-containing polyacrylate resin which is obtainable by polymerizing, in an organic solvent or solvent mixture and in the presence of at least one polymerization initiator, (a1) an essentially carboxyl-free ester of (meth)acrylic acid and a cycloaliphatic C6 to C10 alcohol, which ester is different from (a2), (a3), (a4) and (a6), is copolymerizable with (a2), (a3), (a4), (a5) and (a6) and is not cyclohexyl methacrylate, or a mixture of such monomers, (a2) an essentially carboxyl-free (meth)acrylic ester which is different from (a1), (a3), (a4) and (a6) and is copolymerizable with (a1), (a3), (a4), (a5) and (a6), or a mixture of such monomers, (a3) an ethylenically unsaturated monomer which is copolymerizable with (a1), (a2), (a4), (a5) and (a6), carries at least one hydroxyl group per molecule and is essentially free of carboxyl groups, or a mixture of such monomers, (a4) if desired, one or more vinyl esters of α-branched monocarboxylic acids having 5 to 18 carbon atoms per molecule and/or at least one reaction product of acrylic acid and/or methacrylic acid with the glycidyl ester of an α-branched monocarboxylic acid having 5 to 18 carbon atoms per molecule or, instead of the reaction product, an equivalent quantity of acrylic and/or methacrylic acid which is then reacted, during or after the polymerization reaction, with the glycidyl ester of an α-branched monocarboxylic acid having 5 to 18 carbon atoms per molecule, (a5) an ethylenically unsaturated monomer carrying at least one carboxyl group per molecule and copolymerizable with (a1), (a2), (a3), (a4) and (a6), or a mixture of such monomers, and (a6) if desired, an essentially carboxyl-free, ethylenically unsaturated monomer which is copolymerizable with (a1), (a2), (a3), (a4) and (a5) and is different from (a1), (a2), (a3) and (a4), or a mixture of such monomers, and, after the end of the polymerization, if desired, the resulting polyacrylate resin is at least partially neutralized and dispersed in water, the nature and quantity of (a1), (a2), (a3), (a4), (a5) and (a6) being selected such that the polyacrylate resin (A) has the desired OH number and acid number.

The present invention additionally provides a method of producing a multicoat coating system on a substrate surface using these coating compositions, and to the use of the coating compositions in the sector of automotive refinishing.

It is surprising and was not foreseeable that the coating compositions according to the invention, when used as transparent topcoat material over a pigmented basecoat, have the advantage that they cause little incipient dissolution of the basecoat, have very little influence on the metallic effect and at the same time are of good chemical resistance and weathering resistance. Furthermore, the coating compositions according to the invention exhibit the advantage of good topcoat holdout and, under the conditions of automotive refinishing, show very good leveling and good application characteristics. A further advantage is that the coating compositions can be fully cured at low temperatures and can thus be employed for the sector of automotive refinishing. Even given the curing of the coating compositions at these low temperatures, they cure rapidly while at the same time retaining processability for a long time. Finally, when used as clearcoat material over a basecoat, the coating compositions according to the invention exhibit markedly improved adhesion to the basecoat.

In the text below, the individual constituents of the coating composition according to the invention will now be discussed in more detail.

Before a closer description of the preparation of the polyacrylate resins to be employed in accordance with the invention, two definitions will be explained in advance:

1. (Meth)acrylic acid is occasionally used as an abbreviation for "methacrylic acid or acrylic acid".

2. The formulation "essentially carboxyl-free" is intended to denote that components (a1), (a2), (a3), (a4) and (a6) can have a low carboxyl group content (but at least enough to give a polyacrylate resin prepared from these components an acid number of not more than 10 mg of KOH/g). However, it is preferred to keep the content of carboxyl groups in components (a1), (a2), (a3), (a4) and (a6) as low as possible. It is particularly preferred to employ components (a1), (a2), (a3), (a4) and (a6) which are free of carboxyl groups.

The polyacrylate resins to be employed in accordance with the invention are prepared using, as component (a1), an essentially carboxyl-free ester of (meth)acrylic acid and a cycloaliphatic alcohol having 6 to 10 carbon atoms, which ester is copolymerizable with (a2), (a3), (a4), (a5) and (a6), is different from (a2), (a3), (a4) and (a6) and is not cyclohexyl methacrylate, or using a mixture of such monomers.

Examples of cycloaliphatic esters of acrylic acid and/or methacrylic acid which are suitable as component (a1) are cyclohexyl acrylate, 4-tert-butylcyclohexyl acrylate, 4-tert-butylcyclohexyl methacrylate, isobornyl acrylate and isobornyl methacrylate. As component (a1) it is preferred to employ 4-tert-butylcyclohexyl acrylate and/or 4-tert-butyl-cyclohexyl methacrylate.

As component (a2) it is possible to employ any essentially carboxyl-free ester of (meth)acrylic acid which is copolymerizable with (a1), (a3), (a4), (a5) and (a6) and is different from (a1), (a3), (a4) and (a6), or a mixture of such (meth) acrylic esters. Examples are alkyl acrylates and alkyl methacrylates having up to 20 carbon atoms in the alkyl radical, for example methyl, ethyl, propyl, isopropyl, butyl, isobutyl, pentyl, isoamyl, hexyl, ethylhexyl, furfuryl, octyl, 3,5,5-trimethylhexyl, decyl, hexadecyl, octadecyl, stearyl and lauryl acrylate and methacrylate.

Preference is given to employing mixtures of alkyl acrylates and/or alkyl methacrylates as component (a2), at least 20% by weight of said mixtures comprising n-butyl and/or t-butyl acrylate and/or n-butyl and/or t-butyl methacrylate.

As component (a2) it is also possible to employ ethyltriglycol (meth)acrylate and methoxyoligoglycol (meth) acrylate with a number-average molecular weight of preferably 550, or other ethoxylated and/or propoxylated, hydroxyl-free (meth)acrylic acid derivatives.

It is possible to employ as component (a3) ethylenically unsaturated monomers which are copolymerizable with (a1), (a2), (a4), (a5) and (a6), carry at least one hydroxyl group per molecule and are essentially carboxyl-free, or a mixture of such monomers. Examples are hydroxyalkyl esters of acrylic acid, methacrylic acid or of another α,β-ethylenically unsaturated carboxylic acid. These esters can be derived from an alkylene glycol which is esterified with the acid, or they can be obtained by reacting the acid with an alkylene oxide.

If it is desired for the acrylate copolymer to be of high reactivity, then hydroxyalkyl esters with primary hydroxyl groups can be employed exclusively; if the polyacrylate is to be less reactive, hydroxyalkyl esters having secondary hydroxyl groups can be used exclusively. It is of course also possible to use mixtures of hydroxyalkyl esters having primary hxydroxyl groups and hydroxyalkyl esters having secondary hydroxyl groups. Examples of suitable hydroxyalkyl esters of α,β-unsaturated carboxylic acids having primary hydroxyl groups are hydroxyethyl acrylate, 3-hydroxypropyl acrylate, hydroxybutyl acrylate, hydroxyamyl acrylate, hydroxyhexyl acrylate, hydroxyoctyl acrylate and the corresponding methacrylates, and also the corresponding hydroxy esters of other α,β-unsaturated carboxylic acids. Examples of hydroxyalkyl esters having a secondary hydroxyl group which can be used are 2-hydroxypropyl acrylate, 2-hydroxybutyl acrylate, 3-hydroxybutyl acrylate and the corresponding methacrylates. It is of course also possible in each case to employ the corresponding esters of other α,β-unsaturated carboxylic acids, for example those of crotonic acid and of isocrotonic acid.

If desired, it is possible to employ as component (a3), at least in part, trimethylolpropane monoallyl ether. The proportion of trimethylolpropane monoallyl ether is customarily from 2 to 10% by weight, based on the overall weight of the monomers (a1) to (a6) employed in preparing the polyacrylate resin. In addition, however, it is also possible to add from 2 to 10% by weight, based on the overall weight of the monomers employed in preparing the polyacrylate resin, of trimethylolpropane monoallyl ether to the finished polyacrylate resin. The olefinically unsaturated polyols, such as, in particular, trimethylolpropane monoallyl ether, can be employed as sole hydroxyl-containing monomers (a3), but in particular can be employed proportionally in combination with others of the hydroxyl-containing monomers mentioned.

It is preferred to employ as component (a3), at least in part, only those monomers or mixtures of monomers (referred to below as component (a31)) which, when the respective monomer is polymerized alone, give a polyacrylate resin and/or polymethacrylate resin having a glass transition temperature of from −20° C. to +6° C., or from +50° C. to 80° C. This means that, when mixtures of different monomers are used as component (a31), suitability also extends of course to those mixtures which, on polymerization of component (a31) alone, give a polyacrylate resin and/or polymethacrylate resin having a $T_g$ value which is outside these ranges indicated for the individual monomers.

The glass transition temperature can be calculated approximately by the person skilled in the art with the aid of the formula $$\frac{1}{T_G} \sum_{n=1}^{n=x} \frac{W_n}{T_{Gn}}$$

$T_G$=glass transition temperature of the polymer

X=number of different monomers copolymerized, $W_n$=proportion by weight of the nth monomer $T_{Gn}$=glass transition temperature of the homopolymer of the nth monomer.

Component (a31) is preferably selected from hydroxyethyl methacrylate, hydroxyethyl acrylate, 3-hydroxypropyl methacrylate, 3-hydroxypropyl acrylate, 2-hydroxypropyl methacralate and/or 2-hydroxypropyl acrylate.

It is very particularly preferred to employ as component (a31) 3-hydroxypropyl methacrylate and/or 3-hydroxypropyl acrylate and/or 2-hydroxypropyl methacrylate and/or 2-hydroxypropyl acrylate or a mixture of 1.) hydroxyethyl acrylate and/or hydroxyethyl methacrylate and 2.) 3-hydroxypropyl acrylate and/or methacrylate and/or 2-hydroxypropyl acrylate and/or methacrylate.

In particular, mixtures of component (a31) and the further hydroxyl-containing monomers (a32) already described above which are different from component (a31) are employed as component (a3).

As component (a4), use is made if desired of one or more vinyl esters of α-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins can be cracking products of paraffinic hydrocarbons, such as mineral oil fractions, and can contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Examples of other olefinic starting materials are propylene trimer, propylene tetramer and diisobutylene. The vinyl esters can, however, also be prepared in a manner known per se from the acids, for example by reacting the acid with acetylene.

Owing to their ready availability, particular preference is given to employing vinyl esters of saturated aliphatic monocarboxylic acids having 9 to 11 carbon atoms and being branched at the a carbon atom.

As component (a4), together if desired with the vinyl ester or instead of the vinyl ester, use is made of the reaction product of acrylic acid and/or methacrylic acid with the glycidyl ester of an α-branched monocarboxylic acid having 5 to 18 carbon atoms per molecule. Glycidyl esters of highly branched monocarboxylic acids are obtainable under the trade name "Cardura". The reaction of the acrylic or methacrylic acid with the glycidyl ester of a carboxylic acid having a tertiary a carbon atom can be carried out before, during or after the polymerization reaction. The component (a4) employed is preferably the reaction product of acrylic and methacrylic acid with the glycidyl ester of Versatic acid. This glycidyl ester is commercially available under the name "Cardura E10".

As component (as) it is possible to employ any ethylenically unsaturated monomer which carries at least one carboxyl group per molecule and is copolymerizable with (a1), (a2), (a3), (a4) and (a6), or a mixture of such monomers. It is preferred to employ as component (a5) acrylic acid and/or methacrylic acid. However, it is also possible to employ other ethylenically unsaturated acids having up to 6 carbon atoms in the molecule. Examples of such acids are ethacrylic acid, crotonic acid, maleic acid, fumaric acid and itaconic acid. It is also possible to employ as component (a5) maleic acid mono(meth)acryloyloxyethyl ester, succinic acid mono (meth)acryloyloxyethyl ester and phthalic acid mono(meth) acryloyloxyethyl ester.

As component (a6) it is possible to employ all essentially carboxyl-free, ethylenically unsaturated monomers which are copolymerizable with (a1), (a2), (a3), (a4) and (a5) and are different from (a1), (a2), (a3) and (a4), or mixtures of such monomers. It is preferred to employ as component (a6) aromatic vinyl hydrocarbons, such as styrene, an α-alkylstyrene and vinyltoluene.

As component (a6) it is possible to employ polysiloxane macromonomers in combination with other monomers mentioned as being suitable as component (a6). Suitable polysiloxane macromonomers are those having a number-average molecular weight of from 1000 to 40,000, preferably from 2000 to 10,000, and on average from 0.5 to 2.5, preferably from 0.5 to 1.5, ethylenically unsaturated double bonds per molecule. Examples of suitable polysiloxane macromonomers are those described in DE-A 38 07 571 on pages 5 to 7, in DE-A 37 06 095 in columns 3 to 7, in EP-B 358 153 on pages 3 to 6, and in U.S. Pat. No. 4,754,014 in columns 5 to 9. Also suitable are other acryloxysilane-containing vinyl monomers having the abovementioned molecular weights and contents of ethylenically unsaturated double bonds, examples being compounds which can be prepared by reacting hydroxy-functional silanes with epichlorohydrin and then reacting the reaction product with methacrylic acid and/or hydroxyalkyl esters of (meth)acrylic acid.

As component (a6) it is preferred to employ polysiloxane macromonomers of the following formula:

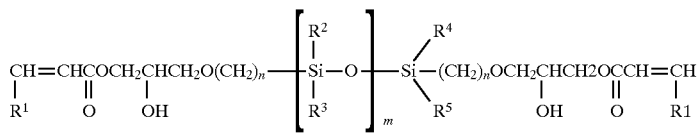

where
- $R^1$=H or $CH_3$
- $R^2$, $R^3$, $R^4$, $R^5$=identical or different aliphatic hydrocarbon radicals having 1 to 8 carbon atoms, especially methyl, or phenyl radical.
- n=2 to 5, preferably 3
- m=8 to 50

Particular preference is given to employing the $\omega,\omega'$-acryloxy-organofunctional polydimethylsiloxane of the formula

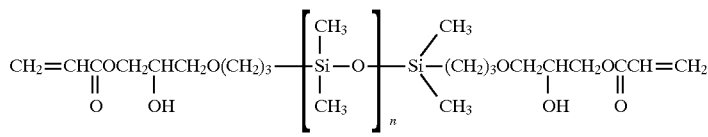

where
n≈30 to 50.

Other polysiloxane macromonomers preferably employed as component (a6) are those which have been prepared by reacting from 70 to 99.999 mol % of a compound (1) represented by the formula (I)

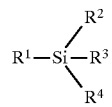

in which $R^1$ is an aliphatic hydrocarbon group having 1 to 8 carbon atoms or a phenyl radical, and R2, $R^3$ and $R^4$ are each a halogen radical or an alkoxy radical having 1 to 4 carbon atoms or a hydroxyl group, with from 30 to 0.001 mol % of a compound (2) represented by the formula (II)

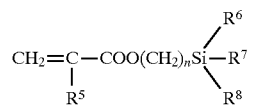

in which $R^5$ is a hydrogen atom or a methyl radical, $R^6$, $R^7$ and $R^8$ are each halogen, OH— or an alkoxy radical having 1 to 4 carbon atoms or an aliphatic hydrocarbon group having 1 to 8 carbon atoms, at least one of the radicals $R^6$, $R^7$ or $R^8$ being OH— or an alkoxy group, and n being an integer from 1 to 6.

Examples of suitable compounds (1) and (2) are given in WO 92/22615 on page 13, line 18 to page 15, line 9.

The reaction between the compounds (1) and (2) is brought about by the dehydrating condensation of the hydroxyl groups which are present in these compounds and/or of the hydroxyl groups which can be attributed to the hydrolysis of the alkoxy groups in these compounds. Depending on the reaction conditions, the reaction comprises a dealcoholizing condensation in addition to the dehydration reaction. If the compounds (1) or (2) contain halogen radicals, the reaction between (1) and (2) is brought about by dehydrohalogenation.

The conditions under which the reaction between the compound (1) and the compound (2) is carried out are likewise described in the international patent application bearing the international publication no. WO 92/22615 on page 15, line 23 to page 18, line 10.

The quantity of the polysiloxane macromonomer or macromonomers (a6) employed to modify the acrylate copolymers (A) is less than 5% by weight, preferably less than 3% by weight, particularly preferably from 0.05 to 2.5% by weight, and very particularly preferably from 0.05 to 0.8% by weight, in each case based on the overall weight of the monomers employed to prepare the copolymer (A).

The use of such polysiloxane macromonomers leads to an improvement in the slip of the aqueous polyurethane coating composition.

The nature and quantity of components (a1) to (a6) is [sic] selected such that the polyacrylate resin (A) has the desired OH number and acid number. Acrylic resins which are employed with particular preference are obtained by polymerizing
- (a1) from 5 to 80% by weight, preferably from 5 to 30% by weight, of component (a1),
- (a2) from 5 to 80% by weight, preferably from 5 to 30% by weight, of component (a2),
- (a3) from 10 to 60% by weight, preferably from 10 to 40% by weight, of component (a3),
- (a4) from 0 to 20% by weight, preferably from 0 to 15% by weight, of component (a4),
- (a5) from 1 to 15% by weight, preferably from 2 to 8% by weight, of component (a5) and
- (a6) from 0 to 40% by weight, preferably from 0 to 30% by weight, of component (a6), the sum of the proportions by weight of components (a1) to (a6) being in each case 100% by weight.

The acrylic resin is obtained with particular preference by polymerization using
- (a31) from 5 to 60% by weight, preferably from 5 to 40% by weight, particularly preferably from 10 to 40% by weight, of component (a31) and
- (a32) from 0 to 55% by weight, preferably from 5 to 20% by weight, of component (a32), the percentages by weight being based on the overall weight of the amounts of components (a1) to (a6).

The polyacrylate resins (A) employed in accordance with the invention are prepared in an organic solvent or solvent mixture and in the presence of at least one polymerization initiator. The organic solvents and polymerization initiators employed are those which are customary for the preparation of polyacrylate resins and are suitable for the preparation of aqueous dispersions.

Examples of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol, and derivatives based on propylene glycol, for example ethyl ethoxypropionate, methoxypropyl acetate and the like.

Examples of polymerization initiators which can be used are initiators which form free radicals, for example t-butyl perethylhexanoate, benzoyl peroxide, azobisisobutyronitrile and t-butyl perbenzoate. The polymerization is expediently carried out at a temperature of from 80° to 180° C., preferably from 110° to 140° C. As solvent it is preferred to employ ethoxyethyl propionate and butyl acetate.

The polyacrylate resin (A) is preferably prepared by a two-stage process, since in this way the resulting aqueous coating compositions have a better processability. Preference is given, therefore, to employing polyacrylate resins which are obtainable by I. polymerizing a mixture of (a1), (a2), (a3), (a4) and (a6) or a mixture of portions of components (a1), (a2), (a3), (a4) and (a6) in an organic solvent, II. after at least 60% by weight of the mixture consisting of (a1), (a2), (a3), (a4) and if desired (a6) has been added, adding (a5) and any remaining portion of components (a1), (a2), (a3), (a4) and (a6) and continuing polymerization, and III. after the end of the polymerization, subjecting the resulting polyacrylate resin to at least partial neutralization and dispersing it in water.

Besides this, however, it is also possible to introduce component (a4) initially together with at least a portion of the solvent and to meter in the rest of the components. Furthermore, it is also possible to include only part of component (a4) in the initial charge, together with at least a portion of the solvent, and to add the remaining portion of this component as described above. It is preferred, for example, initially to charge at least 20% by weight of the solvent and about 10% by weight of component (a4) and, if desired, portions of components (a1) and (a6).

Also preferred is the preparation of the polyacrylate resins (A) employed in accordance with the invention by a two-stage process in which stage (I) lasts for from 1 to 8 hours, preferably from 1.5 to 4 hours, and the addition of the mixture of (a5) and the possible remaining portion of components (a1), (a2), (a3), (a4) and (a6) is made in the course of from 20 to 120 min., preferably in the course of from 30 to 90 min. After the end of the addition of the mixture of (a5) and the possible remaining portion of components (a1), (a2), (a3), (a4) and (a6), polymerization is continued until all of the monomers employed have undergone essentially complete reaction.

The quantity and rate of addition of the initiator is preferably chosen so as to give a polyacrylate resin (A) having a number-average molecular weight of from 1000 to 7000, preferably from 1800 to 5000. It is preferred to commence the addition of initiator at the same time as the addition of the monomers and to end it about half an hour after the addition of the monomers has ended. The initiator is preferably added in a constant quantity per unit time. After the end of initiator addition, the reaction mixture is held at polymerization temperature for a period (generally 1½ h) until all of the monomers employed have undergone essentially complete reaction. "Essentially complete reaction" is intended to denote that preferably 100% by weight of the monomers employed have been reacted but that it is also possible for a small residual monomer content of not more than up to about 0.5% by weight, based on the weight of the reaction mixture, to remain unreacted.

The polyacrylate resin (A) obtained has an OH number of from 40 to 200, preferably from 60 to 140, mg of KOH/g, an acid number of from 20 to 100 mg of KOH/g, preferably from 25 to 50 mg of KOH/g. With particular preference the polyacrylate resin (A) obtained also has a glass transition temperature of from −40° to +60° C., preferably from −20° to +40° C.

For calculating the glass transition temperature, the Tg value of the homopolymer of the reaction product of acrylic acid and Cardura E10 is equated with equivalent to the glass transition temperature of the homopolymer of isodecyl methacrylate (−41° C).

After the end of polymerization, the polyacrylate resin obtained is partially neutralized and is dispersed in water. The degree of neutralization to be established in each case depends on the acid number of the acrylate and is in general between 50 and 90% for acid numbers <70 mg of KOH/g and between 30 and 80% for acid numbers >70 mg of KOH/g. For the neutralization it is possible to use both organic bases and inorganic bases. Preference is given to using primary, secondary and tertiary amines, for example ammonia, ethylamine, propylamine, dimethylamine, dibutylamine, cyclohexylamine, benzylamine, morpholine, piperidine, diethanolamine and triethanolamine. It is particularly preferred to employ tertiary amines as neutralizing agents, especially dimethylethanolamine, triethylamine, dimethylisopropylamine, tripropylamine and tributylamine.

The neutralization reaction is generally carried out by mixing the neutralizing base with the polyacrylate resin. In this procedure, it is preferred to employ a quantity of base such that the topcoat composition has a pH of from 7 to 8.5, preferably from 7.2 to 7.8.

Subsequently, the partially or completely neutralized polyacrylate resin is dispersed by adding water, to give an aqueous polyacrylate resin dispersion. If desired, some or all of the organic solvent can be distilled off. The polyacrylate resin dispersions according to the invention contain polyacrylate resin particles whose average particle size is preferably between 60 and 300 nm (measurement method: laser light scattering, measuring instrument Malvern Autosizer 2 C).

The polyacrylate resin (A) employed in accordance with the invention is customarily employed in the coating compositions in a quantity of from 30 to 50% by weight (calculated as solids, i.e. excluding water component), based on the overall weight of the coating composition.

The polyisocyanate component (B) comprises any desired organic polyisocyanates having free isocyanate groups attached to aliphatic, cycloaliphatic, araliphatic and/or aromatic structures. Preference is given to employing polyisocyanates having 2 to 5 isocyanate groups per molecule and viscosities of from 200 to 2000 mPas (at 23° C.). If desired, small quantities of organic solvent can also be added to the polyisocyanates, preferably from 1 to 25% by weight based on pure polyisocyanate, in order thus to improve the ease of incorporation of the isocyanate and, if desired, to reduce the viscosity of the polyisocyanate to a value which is within the abovementioned ranges. Solvents which are suitable as additives for the polyisocyanates are, for example, ethoxyethyl propionate, methoxypropyl acetate and the like.

Examples of suitable isocyanates are described, for example, in "Methoden der organischen Chemie", Houben-Weyl, Volume 14/2, 4th Edition, Georg Thieme Verlag, Stuttgart 1963, page 61 to 70, and by W. Siefken, Liebigs Ann. Chem. 562, 75 to 136. Examples of those suitable are 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate (isophorone diisoyanate" [sic]), 2,5- and 3,5-bis(isocyanatomethyl)-8-methyl-1,4-methano-decahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methanehexahydroindane, dicyclohexyl 2,4'- and 4,4'-diisocyanate, 2,4- and 2,6-hexahydrotolylene diisocyanate, perhydro-2,4'- and 4,4'-diphenylmethane diisocyanate, ω,ω'-diisocyanato-1,4-diethylbenzene, 1,3- and 1,4-phenylene diisocyanate, 4,4'-diisocyanato-biphenyl, 4,4'-diisocyanato-3,3'-dichlorobiphenyl, 4,4'-diisocyanato-3,3'-dimethoxy-biphenyl, 4,4'-diisocyanato-3,3'-dimethyl-biphenyl, 4,4'-diisocyanato-3,3'-diphenyl-biphenyl, 2,4'- and 4,4'-diisocyanatodiphenylmethane, naphthylene 1,5-diisocyanate, tolylene diisocyanates, such as 2,4- and 2,6-tolylene diisocyanate, N,N'-(4,4'-dimethyl-3,3'-diisocyanatodiphenyl)-uretdione, m-xylylene diisocyanate, dicyclohexylmethane diisocyanate, tetramethylxylylene diisocyanate, but also triisocyanates, such as 2,4,4'-triisocyanatodiphenyl ether, 4,4',4"-triisocyanatotriphenylmethane. It is also possible to employ polyisocyanates containing isocyanurate groups and/or biuret groups and/or allophanate groups and/or uretdione groups and/or urethane groups and/or urea groups. Polyisocyanates containing urethane groups, for example, are obtained by reacting some of the isocyanate groups with polyols, for example trimethylol propane and glycerol.

Preferably, aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates, are employed. With very particular preference, mixtures are employed of polyisocyanates which contain uretdione and/or isocyanurate groups and/or allophanate groups and are based on hexamethylene diisocyanate, as are formed by catalytic oligomerization of hexamethylene diisocyanate using appropriate catalysts. Otherwise, the polyisocyanate component (B) can comprise any desired mixtures of the polyisocyanates listed by way of example.

In order to prepare the ready-to-use, aqueous two-component polyurethane coating compositions, the polyisocyanate component (B) is mixed shortly before application with the polyacrylate resin component (A). Thorough mixing can be accomplished simply by stirring at room temperature, or else by dispersion. The polyisocyanate component (B) is employed in this context in a quantity such that the weight ratio of polyacrylate resin solids to polyisocyanate solids is from 60:40 to 90:10, particularly preferably from 70:30 to 85:15. The ratio of the number of free OH groups of component (A) to the number of isocyanate groups of component (B) is customarily in the range from 1:2 to 2:1 in this case.

In addition to the polyacrylate resin (A) employed in accordance with the invention, the aqueous two-component polyurethane resin coating compositions according to the invention can also contain crosslinked polymer microparticles as disclosed, for example, in EP-A-38 127, and/or one or more compatible resins, examples being water-dilutable or water-soluble polyacrylate resin(s), polyurethane resin(s), polyester resin(s), alkyd resin(s) or epoxy resin esters. The proportion of this(these) further resin(s) is customarily between 0 and 25% by weight, preferably between 0 and 15% by weight, based in each case on the overall weight of the coating composition and on the solids content of the binder.

Thus the coating compositions according to the invention can have added to them, for example, up to 30% by weight, based on the binder solids content of the polyacrylate resin (A), of an acrylate prepared by emulsion polymerization having an OH number which is preferably between 40 and 200 mg of KOH/g. The preparation of such emulsion polymers is described for example in DE-A 40 09 000, in which case, however, the OH number of the acrylates must be increased appropriately.

A further example of another suitable binder is a hydroxyl-containing polyacrylate resin which is described in German Patent Application P 44 07 409.3, which is not a prior publication, and which is obtainable by polymerizing (m1) from 10 to 51% by weight of a mixture of
  (m11) one or more monomers selected from the group 4-hydroxy-n-butyl acrylate and/or 4-hydroxy-n-butyl methacrylate and/or 3-hydroxy-n-butyl acrylate and/or 3-hydroxy-n-butyl methacrylate, and
  (m12) one or more monomers selected from the group 3-hydroxy-n-propyl acrylate and/or 3-hydroxy-n-propyl methacrylate and/or 2-hydroxy-n-propyl acrylate and/or 2-hydroxy-n-propyl methacrylate, (m2) from 0 to 20% by weight of a hydroxyl-containing ester of acrylic acid or methacrylic acid having at least 5 carbon atoms in the alcohol residue, which ester is different from (m1), or a mixture of such monomers, (m3) from 28 to 85% by weight of an aliphatic or cycloaliphatic ester of acrylic acid or methacrylic acid having at least 4 carbon atoms in the alcohol residue, which is different from (m1) and (m2), or a mixture of such monomers, (m4) from 0 to 25% by weight of an aromatic vinyl hydrocarbon which is different from (m1), (m2) and (m3), or a mixture of such monomers, (m5) from 0 to 10% by weight of an ethylenically unsaturated carboxylic acid or of a mixture of ethylenically unsaturated carboxylic acids, and (m6) from 0 to 20% by weight of an ethylenically unsaturated monomer which is different from (m1), (m2), (m3), (m4) and (m5), or a mixture of such monomers to give a polyacrylate resin having a hydroxyl number of from 60 to 200 mg of KOH/g, an acid number of from 0 to 80 mg of KOH/g and a number-average molecular weight of from 1000 to 5000, the sum of the proportions by weight of components (m1) to (m6) being in each case 100% by weight.

Examples of the compounds suitable as monomer components (m1) to (m6) are the compounds listed in the description of the acrylate resin (A).

Furthermore, the coating compositions according to the invention can also comprise, in addition, customary auxiliaries and additives, such as thickeners and wetting agents, in particular. Preferably, a nonionic polyurethane thickener is added to the aqueous coating compositions according to the invention, since this leads to a better transparency and better emulsifiability of the polyisocyanate. Preferably, in addition, a wetting agent based on an alkyl-modified polyether is added to the aqueous coating compositions according to the invention, since this likewise improves the transparency of the coating composition and the gloss and leveling of the coating composition.

Over and above these, the aqueous coating compositions can additionally comprise further customary auxiliaries and additives, such as defoaming agents and the like, for example. The quantity of auxiliaries and additives employed (including wetting agents and thickeners) is customarily between 0.01 and 10% by weight, based on the overall weight of the coating compositions.

The aqueous coating compositions according to the invention can also contain customary organic solvents. The proportion thereof is kept as low as possible. It is usually below 15% by weight, preferably from 2 to 10% by weight, based in each case on the overall weight of the coating composition.

Examples of suitable solvents are various esters, such as ethylglycol acetate, butylglycol acetate, ethyldiglycol acetate, ethyl ethoxypropionate, methoxypropyl acetate, and the like.

The coating materials according to the invention are generally adjusted to a pH of between 6.5 and 9.0. The pH can be adjusted using customary amines, such as triethylamine, dimethylaminoethanol and N-methylmorpholine, for example.

The coating materials according to the invention can be applied by customary application methods, for example spraying, knife-coating, brushing, dipping, to any desired substrates, such as metal, wood, plastic or paper. The coating materials according to the invention are preferably employed for the production of topcoats. The coating materials according to the invention can be employed both for the production-line finishing and for the refinishing of car bodies. They are preferably employed, however, in the refinishing sector. The aqueous coating compositions according to the invention can be employed as fillers and for producing one-layer topcoats, and as pigmented basecoats or as clearcoats in a process for producing a multicoat paint system (basecoat/clearcoat process).

If the coating materials according to the invention are employed to produce single-layer topcoats or as basecoats, then they can be pigmented with pigments, for example pigments on an inorganic basis, examples being titanium dioxide, iron oxide, carbon black, etc. and/or pigments on an organic basis and/or metal pigments, for example aluminum bronzes and/or pearlescent and interference pigments. Aluminum bronzes and pearlescent and interference pigments are examples of effect pigments. If the coating compositions according to the invention are employed as pigmented basecoats, then they can be coated over with the coating materials according to the invention which contain no pigments or are pigmented only with transparent pigments, but can also be coated over with conventional clearcoats based on organic solvents, with aqueous clearcoats or else with powder clearcoats.

Preferably, however, the coating materials according to the invention are employed as clearcoats.

Accordingly, the present invention also provides a method of producing a multilayer protective and/or decorative coating on a substrate surface, in which (1) a pigmented basecoat is applied to the substrate surface, (2) a polymer film is formed from the basecoat applied in step (1), (3) a transparent topcoat is applied to the resulting basecoat, which topcoat comprises (A) a hydroxyl-containing polyacrylate resin and (B) a crosslinking agent, and subsequently (4) basecoat and topcoat are cured together, characterized in that the coating composition according to the invention is employed as topcoat.

The basecoats employed in this method are known and therefore require no closer description. Examples of suitable basecoats are also the basecoats described in DE-A 41 10 520, DE-A 40 09 000, DE-A 40 24 204, EP-A-355 433, DE-A 35 45 618, DE-A 38 13 866 and DE-A-42 32 717.2.

Also suitable are the basecoats described in German Patent Application P 43 27 416.1, which is not a prior publication, which basecoats are characterized in that they comprise a hydroxyl-containing polyester having a weight-average molecular weight Mw of 40,000–200,000 and a polydispersity Mw/Mn>8 and in that, to prepare he polyester, at least 50% by weight of aromatic dicarboxylic acids or esterifiable derivatives thereof have been employed, but where the content of the phthalic anhydride is not more than 80% by weight and the percentages by weight are based in each case on the overall weight of the acid components employed to prepare the polyester.

The coating compositions according to the invention are distinguished in particular by good adhesion to the basecoat, good mar resistance and a high degree of hardness in the resulting coatings. In addition, the coating compositions exhibit rapid drying coupled with long processability (pot life). Furthermore, the resulting coatings, especially in the case of the clearcoats, show good mechanical properties, such as, for example, good gloss retention, good fullness and good evenness.

The invention is illustrated in more detail in the examples which follow. All parts and percentages are by weight, unless expressly stated otherwise.

I. Preparation of the Hydroxyl-Containing Acrylic

Resins E1 to E6 and V1 to V3 (Comparison Examples)

The monomers employed to prepare the hydroxyl-containing acrylic resins E1 to E6 (according to the invention) and V1 to V3 (comparison) are indicated in Table 1. The hydroxy-n-propyl (meth)acrylate used was a commercial mixture of 25% by weight 3-hydroxy-n-propyl (meth)acrylate and 75% by weight 2-hydroxy-n-propyl (meth)acrylate. The acrylic resins are prepared by placing 34.27% of ethyl ethoxypropionate, based on the mass of 100% of the monomer mixture, in a 4 l reactor which is suitable for polymerization reactions, and heating this component to 130° C. A mixture of 100% of the monomers and 0.5% mercaptoethanol, based on the mass of 100% of the monomer mixture, was metered into this initial charge at a uniform rate over the course of 4 hours, and, beginning at the same time but in 4.5 hours, 11.9% of the initiator solution, based on the mass of 100% of the monomer mixture, consisting of a 30.0% strength solution of tert-butyl perethylhexanoate in ethyl ethoxypropionate. After post-polymerization for 2 hours, the reactor temperature was lowered to 90° C. and a degree of neutralization of 85% was established by addition of dimethylethanolamine, before diluting with deionized water to a solids content of about 40%. Subsequently, by azeotropic distillation under vacuum, the organic solvent was removed down to a residual quantity of about ≦3%, and the mixture was adjusted with water to a solids content of 40–45%.

The properties of the resulting acrylic resins are shown in Table 2.

II. Preparation of the Coating Compositions E1 to E6 of Examples 1 to 6 and of the Coating Compositions V1 to V3 of Comparison Examples 1 to 3

II.1. Preparation of a Curing Agent Solution

The components indicated below are mixed to produce a curing agent solution:

| | |
|---|---|
| Ethyl ethoxypropionate | 20.0 parts |
| Desmodur ® VPLS2102[1] | 45.0 parts |
| Desmodur ® N 3300[2] | 45.0 parts |

[1] Commercial polyisocyanate of the allophanate type from Bayer AG based on hexamethylene diisocyanate having a solids content of 100% and an NCO content of 19.5%.
[2] Commercial polyisocyanate from Bayer AG based on a hexamethylene diisocyanate trimer having an average functionality of between 3 and 4 and a uretdione group content of between 0 and 3% by weight and a solids content of 100% and an isocyanate content of 23.0%.

II.2. Preparation of the Transparent Topcoats E1 to E6 and V1 to V3

The clearcoats are prepared by mixing the components indicated in Table 3, the curing agent solution being added last to the coating mixture.

II.3. Application of the Transparent Topcoats E1 to E6 and V1 to V3 (Comparison Examples)

The coating material thus obtained is then applied to phosphatized and coated steel panels. The phosphatized steel panels are for this purpose coated by spray application with a commercial, conventional filler (commercial product Glasurit Grundfüller EP 801-1552 from Glasurit GmbH, Münster, with an epoxy-functional binder and an amino-functional curing agent) (dry film thickness about 40 to 60 μm), dried at 80° C. for 45 min and at room temperature for 16 h and wet-sanded with P800 sandpaper and an eccentric sander. Subsequently, a basecoat comprising a mixture of 80 parts of a commercial, conventional metallic basecoat (commercial product Basislack AE 54M 99/9 Basisfarbe Aluminium superfein from Glasurit GmbH, Münster) based on a hydroxyl-containing polyester, cellulose acetobutyrate, wax and a melamine resin and 20 parts of a further commercial, conventional basecoat (commercial product Basislack AE 54M 552 Basisfarbe Helioblau from Glasurit GmbH, Münster) based on a hydroxyl-containing polyester, cellulose acetobutyrate, wax and a melamine resin is applied, by first of all applying one spray pass and, after an intermediate evaporation time of 5 min, applying a second spray pass (spray pressure 4–5 bar in each case). The dry film thickness of the basecoat is about 20 μm. After an evaporation time of 30 min the clearcoat is applied by first of all applying one spray pass and, after an intermediate evaporation time of 3 min, applying a second spray pass (spray pressure 4–5 bar in each case). The panels are then, after testing has been carried out, each dried under different conditions. The dry film thickness of the clearcoat is about 50–80 μm.

The results of testing the resulting coatings are set out in Table 4.

TABLE 1

Composition of the acrylic resins in % by weight

| | E1 | V1 | E2 | E3 | V2 | E4 | E5 | E6 | V3 |
|---|---|---|---|---|---|---|---|---|---|
| Styrene | 23 | 23 | 24 | 16 | 16 | — | 24 | — | 24 |
| n-BMA | 6 | 6 | 6.5 | 6 | 6 | 9 | 6.5 | 9.5 | 21.5 |
| t-BA | — | 14 | — | — | — | — | — | — | — |
| t-BCA | 14 | — | 15 | 38 | — | 22 | 15 | 23 | — |
| MMA | 16 | 16 | 17 | — | 37 | 28 | 17 | 30 | 17 |
| EHA | — | — | — | 6 | 7 | — | — | — | — |
| HPMA | 36 | 36 | — | — | 29 | 36 | — | — | — |
| HPA | — | — | 32.5 | 29 | — | — | — | — | — |
| HEMA | — | — | — | — | — | — | 32.5 | 32.5 | 32.5 |
| AA | 5 | 5 | 5 | 5 | 5 | 5 | 5 | 5 | 5 |

Key to Table 1
n-BMA = n-butyl methacrylate
t-BA = t-butyl acrylate
t-BCA = t-butylcyclohexyl acrylate
MMA = methyl methacrylate
EHA = 2-ethylhexyl acrylate
HPMA = mixture of 25% by weight 3-hydroxy-n-propyl methacrylate and 75% by weight 2-hydroxy-n-propyl methacrylate
HPA = mixture of 25% by weight 3-hydroxy-n-propyl acrylate and 75% by weight 2-hydroxy-n-propyl acrylate
HEMA = 2-hydroxyethyl methacrylate
AA = acrylic acid

TABLE 2

Properties of the acrylic resins

| | E1 | V1 | E2 | E3 | V2 | E4 | E5 | E6 | V3 |
|---|---|---|---|---|---|---|---|---|---|
| OH number [mgKoH/g] | 140 | 140 | 140 | 125 | 113 | 140 | 138 | 140 | 140 |
| Acid number [mgKOG/g] [sic] | 40 | 40 | 40 | 40 | 40 | 40 | 40 | 40 | 40 |
| $M_n$ | 2300 | 3200 | 3100 | 3100 | 3400 | 2900 | 3200 | 3000 | 2700 |
| $M_w$ | 5800 | 7500 | 10,200 | 7200 | 9400 | 7800 | 7600 | 8900 | 6900 |
| $M_n/M_w$ | 2.52 | 2.34 | 3.29 | 2.32 | 2.76 | 2.69 | 2.38 | 2.97 | 2.56 |
| $T_g$ (A) [°C.][1] | 81 | 81 | 49 | 37 | 72 | 77 | 82 | 71 | 66 |
| $T_g$ (a31) [°C.] | 73 | 73 | −7 | −7 | 73 | 73 | 55 | 55 | 55 |
| $T_g$ (a2) [°C.] | 82 | 79 | 82 | 15 | 65 | 83 | 82 | 83 | 71 |

[1] Calculated using the experimental $T_g$ value of 4-t-butylcyclohexyl acrylate equal to 73° C.

TABLE 3

Composition of the clearcoats in parts by weight

| | KE1 | KV1 | KE2 | KE3 | KV2 | KE4 | KE5 | KE6 | KV3 |
|---|---|---|---|---|---|---|---|---|---|
| AE1[1] | 74.— | — | — | — | — | — | — | — | — |
| AV1[1] | — | 74.— | — | — | — | — | — | — | — |
| AE2[1] | — | — | 74.— | — | — | — | — | — | — |
| AE3[1] | — | — | — | 74.— | — | — | — | — | — |
| AV2[1] | — | — | — | — | 74.— | — | — | — | — |
| AE4[1] | — | — | — | — | — | 74.— | — | — | — |
| AE5[1] | — | — | — | — | — | — | 74.— | — | — |
| AE6[1] | — | — | — | — | — | — | — | 74.— | — |
| AV3[1] | — | — | — | — | — | — | — | — | 74.— |
| LS1[2] | 0.9 | 0.9 | 0.9 | 0.9 | 0.9 | 0.9 | 0.9 | 0.9 | 0.9 |
| LS2[3] | 0.9 | 0.9 | 0.9 | 0.9 | 0.9 | 0.9 | 0.9 | 0.9 | 0.9 |
| VLM[4] | 0.2 | 0.2 | 0.2 | 0.2 | 0.2 | 0.2 | 0.2 | 0.2 | 0.2 |
| PGL[5] | 4.0 | 4.0 | 4.0 | 4.0 | 4.0 | 4.0 | 4.0 | 4.0 | 4.0 |
| NCO[6] | 20.0 | 20.0 | 20.0 | 20.0 | 20.0 | 20.0 | 20.0 | 20.0 | 20.0 |

Key to Table 3
[1] Acrylate dispersions E1 to E6 and V1 to V3, described in Table 1, which have been adjusted to a solids content of 40% and neutralized to 85% with dimethylethanolamine
[2] Tinuvin ® 123 from Ciba Geigy, commercial light stabilizer based on a sterically hindered amine (HALS)
[3] Tinuvin ® 384 from Ciba Geigy, commercial light stabilizer based on benzotriazole
[4] Leveling agent, Byk 331 and Tegoflow 425 from Goldschmidt, each 0.05 part
[5] Proglyde DMM from Dow, dipropylene glycol dimethyl ether
[6] Curing agent solution described under section II.1.

TABLE 4

Test results of the coating compositions/coatings

| | KE1 | KV1 | KE2 | KE3 | KV2 | KE4 | KE5 | KE6 | KV3 |
|---|---|---|---|---|---|---|---|---|---|
| Adhesion | 29 | 20 | 3 | 2 | 30 | 5 | 75 | 61 | >75 |
| Viscosity (s) | 30 | 30 | 30 | 30 | 30 | 30 | 30 | 30 | 30 |
| after 2h | 30 | 29 | 29 | 29 | 30 | 30 | 31 | 31 | 31 |
| Dust free (min) | 146 | 158 | 209 | 149 | 105 | 148 | 103 | 130 | 125 |
| Tack free (min) | 310 | 335 | 450 | 360 | 285 | 290 | 215 | 225 | 215 |
| Gasoline test (days) | 9 | >21 | 10 | 9 | 11 | 7 | 9 | 7 | 11 |
| Volvo test | m0/g0 | m0/g0 | m0/g0 | mg/g0 | m2/g1 | m0/g0 | m2/g1–2 | m2/g1 | m1/g2 |
| Color compar. | | | | | | | | | |
| Straight-on viewing | — | dk. | same | light | sl.dk. | light | light | light | dk. |
| Oblique viewing | — | light | same | same | sl.light | same | dk. | dk. | same |
| Assessment | satisf. | unsat. | satisf. | satisf. | unsat. | satisf. | satisf. | satisf. | unsat. |

Key to Table 4

The tests indicated in Table 4 are carried out as follows:
Color in accordance with DIN6174:
  Standard light source D 3 angle measuring device MMK111, Datacolor
  The basecoat used was a mixture of the commercial basecoats from BASF L+F, (Münster-Hiltrup, Germany) series 54. A mixture of 80 parts by weight of 54M 99/9 Basis-farbe Aluminium superfein and 20 parts by weight of 54M 552 Basisfarbe Helioblau was employed. The test coating material is applied to a 40 x 60 cm steel panel as described in Section II.6 and dried at 60° C. for 30 min. After storage at room temperature for 24 h, the color test is carried out. The panels are evaluated under a white Osram Universal neon lamp:
  1. Straight-on viewing: The panels are compared at an angle of about 200 to the vertical with the standard panel (coated with the clearcoat of Example 1 according to the invention).
  2. Oblique viewing: The panels are compared at an angle of about 700 to the vertical with the standard panel (coated with the clearcoat of Example 1 according to the invention).

Evaluation:
  The light/dark change between straight-on viewing and oblique viewing should be as pronounced as possible. The straight-on view is satisfactory if the panel bearing the test clearcoat has the same degree of lightness, or greater, than the standard panel. The oblique viewing is satisfactory if the panel with the test coating material has the same degree of lightness or a lower degree of lightness than the standard panel.
Adhesion testing with the high-pressure cleaner:
High pressure cleaner
80 bar pressure
Flow rate 800 1/h
Temperature: cold
Distance of the nozzle from the test panel: 5 cm
  The test coating material is applied to a 40 x 60 cm steel panel as described under Section II.6 and dried at 60° C. for 30 min. After storage at room temperature for 7 days, a triangle with sides 10 cm long is cut through the coats with a knife. The cut must be made down to the substrate. Subsequently, the sides of the triangle are each subjected to a 10 s blast of the high-pressure cleaner jet.
Assessment: A metal lattice cut into squares, with a mesh size of 1/2 inch (1.3 cm) and a total edge length of 6 inches (15.4 cm) (144 squares) is placed over the triangle. Each square in which there is a loss of adhesion between clearcoat and basecoat is counted.
Dust-free drying:
  About 15 minutes after the spray application of the coating material, a small sample of marine sand (3–4 g) is scattered onto one corner of the panel. The panel is then dropped on its edge from a height of 30 cm (free fall). Dust-free drying has been achieved when there is no adhesion of sand. The test is repeated at 15 minute intervals; shortly before dust dryness is attained, the interval of repetition is shortened to 5 minutes.
Tack-free drying:
  About 20 minutes after the dust-dry state has been reached, the coated panel is covered with a piece of paper measuring about 3 cm². A small plate of hard plastic is placed onto this paper, on to which plastic a weight of 100 g is placed subsequently. After exactly 1 minute, the panel is tested as in the test for dust dryness to ascertain whether the paper still adheres. The test is repeated at 15 minute intervals; shortly before freedom from tack is attained, the interval of repetition is shortened to 5 minutes.
Gasoline resistance:
  As described above, the clearcoat is applied to phosphatized, coated steel panels which are coated with the above-described filler and basecoat, and the panels are dried at room temperature. The gasoline resistance is tested for the first time after storage at room temperature for 24 hours.

Procedure: A cotton wool pad (filter grade, type T950, size 2.3 from Seitz) soaked with 1 ml of premium-grade gasoline (unleaded), on the underside of which pad there is a lattice-like structure, is placed on the coat and subjected to a weight of 100 g for 5 minutes. The structure resulting from the incipient swelling of the coating surface is then assessed visually: not marked, marked, very slightly marked, slightly marked, marked, very marked, very heavily marked. The parameter indicated is the period of time in days, of storage at room temperature, after which the gasoline test is satisfactory, i.e. no marking is evident.

Viscosity:

The viscosity is measured in each case as the flow time at 20° C. in the DIN 4 cup.

Volvo Crack Test:

Test conditions 1 cycle:

4 h at 50° C. in the oven 2 h at 35° C. and 95–100% rel. atmospheric humidity 2 h at 35° C. and 95–100% rel. atmospheric humidity and 2 l of sulfur dioxide 16 h at −30° C. in deep freeze wash panels with water and dry Evaluation:

Degree of blistering in accordance with DIN 53209

Cracking ASTM D660

III. Compilation of the Test Results

The coating compositions of Examples 1 to 6 lead to coatings having a good topcoat holdout, high hardness and high gloss. Further advantages are the good transparency and the fact that the basecoat is not incipiently dissolved.

The clearcoat E1 of Example 1 exhibits outstanding adhesion with good drying. The light/dark contrast of the basecoat is good. In contrast, the clearcoat V1 of Comparison Example 1 exhibits poorer drying, poorer gasoline resistance and a slight incipient dissolution of the basecoat. The light/dark contrast is no longer adequate.

The clearcoat E2 of Example 2 exhibits much better adhesion than the clearcoat of Example 1. The light/dark contrast of the basecoat is good. The drying, however, is slower than that of the clearcoats of Example 1 and of Comparison Example V1.

The clearcoat of Example 5 is poorer in its adhesion than that of Examples E1 to E4. However, the adhesion is markedly better than that of the clearcoat of Comparison Example V3. The light/dark contrast of the basecoat is better here than that of Comparison Example 3.

The clearcoat of Example 3 shows much better adhesion than the clearcoat of Example 1. The light/dark contrast of the basecoat is good. The drying, however, is slower than that of the clearcoats of Example 1 and of Comparison Example V1.

The clearcoat of Comparison Example V2 exhibits sufficient adhesion. The light/dark contrast of the basecoat, however, is inadequate.

The light/dark contrast of the clearcoat of Example 4 is good and the adhesion is markedly better than that of the clearcoat of Example 1.

The clearcoat of Example E6 exhibits poorer adhesion than that of Examples E1 to E4, although this adhesion is markedly improved in relation to the adhesion of the clearcoat of Comparison Example V3. The light/dark contrast of the basecoat is good.

We claim:

1. An aqueous two-component coating composition, comprising an acrylic resin having an hydroxyl number of from about 40 to about 200 mg of KOH/g and an acid number of from about 20 to about 100 mg of KOH/g; and a polyisocyanate component as crosslinking agent; wherein the acrylic resin is obtained by polymerizing, in at least one organic solvent and in the presence of at least one polymerization initiator, component a1) at least one ester of
(i) an acid selected from the group consisting of acrylic acid, methacrylic acid, and mixtures thereof, and
(ii) an alcohol selected from the group consisting of $C_6$ to $C_{10}$ cycloaliphatic alcohols and mixtures thereof, with the proviso that said ester is not cyclohexyl methacrylate;

component a2) at least one ester different from (a1) selected from the group consisting of esters of acrylic acid, esters of methacrylic acid, and mixtures thereof;

component a3) at least one ethylenically unsaturated monomer having at least one hydroxyl group per molecule or a mixture of such monomers;

component a4) optionally one or more monomers selected from the group consisting of:
(i) vinyl esters of α-branched monocarboxylic acids having 5 to 18 carbon atoms per molecule;
(ii) reaction products of acrylic acid, methacrylic acid, and mixtures thereof with glycidyl esters of α-branched monocarboxylic acids having 5 to 18 carbon atoms per molecule, wherein said reaction products may be formed prior to, during, or after polymerization of the acrylic resin; and
(iii) mixtures thereof;

component a5) an ethylenically unsaturated monomer having at least one carboxyl group per molecule, or a mixture of such monomers; and component a6) optionally one or more additional ethylenically unsaturated monomers;

and further wherein the monomers of components (a1) to (a6) are all different and copolymerizable with one another, and the monomers of (a1), (a2), (a3), and (a6) are substantially free of carboxyl groups.

2. An aqueous coating composition according to claim 1, wherein the acrylic resin is at least partially neutralized and dispersed in water.

3. An aqueous coating composition according to claim 1, wherein component (a3) comprises a monomer or a mixture of monomers having a glass transition temperature of from about −20° C. to about +6° C.

4. An aqueous coating composition according to claim 1, wherein component (a3) comprises a monomer or a mixture of monomers for which polymerization of said monomer or monomers alone would produce a resin having a glass transition temperature of from about +50° C. to about +80° C.

5. An aqueous coating composition according to claim 1, wherein polymerization of component (a2) alone would produce a resin having a glass transition temperature of from about −70° C. to about +120° C.

6. An aqueous coating composition according to claim 1, wherein component (a2) comprises at least one member selected from the group consisting of n-butyl methacrylate, n-butyl acrylate, t-butyl methacrylate, t-butyl acrylate, isobutyl methacrylate, isobutyl acrylate, methyl methacrylate, methyl acrylate, 2-ethylhexyl methacrylate, 2-ethylhexyl acrylate, lauryl methacrylate, lauryl acrylate, stearyl methacrylate, stearyl acrylate, ethyltriglycol methacrylate, furfuryl methacrylate, furfuryl acrylate, and mixtures thereof.

7. An aqueous coating composition according to claim 1, wherein component (a1) comprises at least one member selected from the group consisting of cyclohexyl acrylate, isobornyl methacrylate, isobornyl acrylate, 4-t-butylcyclohexyl acrylate, 4-t-butylcyclohexyl methacrylate, and mixtures thereof.

8. An aqueous coating composition according to claim 1, wherein component (a1) comprises at least one member selected from the group consisting of 4-t-butylcyclohexyl acrylate, 4-t-butylcyclohexyl methacrylate, and mixtures thereof.

9. An aqueous coating composition according to claim 1, wherein the acrylic resin is obtained by polymerizing:

from about 5 to about 80 percent by weight of component (a1);

from about 5 to about 80 percent by weight of component (a2);

from about 10 to about 60 percent by weight of component (a3);

up to about 20 percent by weight of component (a4);

from about 1 to about 15 percent by weight of component (a5);

and up to about 40 percent by weight of component (a6), wherein the sum of components (a1) to (a6) is 100 percent.

10. An aqueous coating composition according to claim 1, wherein the acrylic resin is obtained by polymerizing:

from about 5 to about 30 percent by weight of component (a1);

from about 5 to about 30 percent by weight of component (a2);

from about 10 to about 40 percent by weight of component (a3);

up to about 15 percent by weight of component (a4);

from about 2 to about 8 percent by weight of component (a5);

and up to about 30 percent by weight of component (a6), wherein the sum of components (a1) to (a6) is 100 percent.

11. An aqueous coating composition according to claim 1, wherein the acrylic resin has a number-average molecular weight of from about 1000 to about 7000.

12. An aqueous coating composition according to claim 1, wherein the acrylic resin has a number-average molecular weight of from about 1800 to about 5000.

13. An aqueous coating composition according to claim 1, wherein the acrylic resin has a ratio of weight-average molecular weight to number-average molecular weight of less than about 5.0.

14. An aqueous coating composition according to claim 1, wherein the acrylic resin has a ratio of weight-average molecular weight to number-average molecular weight of from about 1.8 to about 4.0.

15. An aqueous coating composition according to claim 1, wherein the acrylic resin has an hydroxyl number of from about 60 to about 140 mg of KOH/g.

16. An aqueous coating composition according to claim 1, wherein the acrylic resin has an acid number of from about 25 to about 50 mg of KOH/g.

17. An aqueous coating composition according to claim 1, wherein the polyisocyanate component is selected from the group consisting of diisocyanates, polyisocyanates, and mixtures thereof.

18. An aqueous coating composition according to claim 17, wherein the polyisocyanate component comprises at least one compound containing isocyanurate groups.

19. An aqueous coating composition according to claim 1, further comprising at least one additional resin that is different from said acrylic resin, wherein said additional resin is selected from the group consisting of acrylic resins, polyurethane resin, polyester resins, alkyl resins, epoxy ester resins, and mixtures thereof.

20. An aqueous coating composition according to claim 19, wherein said additional resin is water-dilutable or water-soluble.

21. A method of producing a multilayer coating on a substrate, comprising the steps of:

(a) applying a basecoat composition to a substrate;

(b) forming a basecoat layer from the applied basecoat composition;

(c) applying a transparent topcoat composition onto the basecoat layer;

(d) forming a topcoat layer from the applied basecoat layer; and (e) curing the basecoat layer and the topcoat layer together, wherein the transparent topcoat composition is formed from an aqueous coating composition according to claim 1.

22. A method according to claim 21, wherein the substrate is at least a portion of the surface of an automotive vehicle.

23. A method according to claim 22, wherein the basecoat layer and the topcoat layer form a refinish coating on the substrate.

* * * * *